Figure 1:
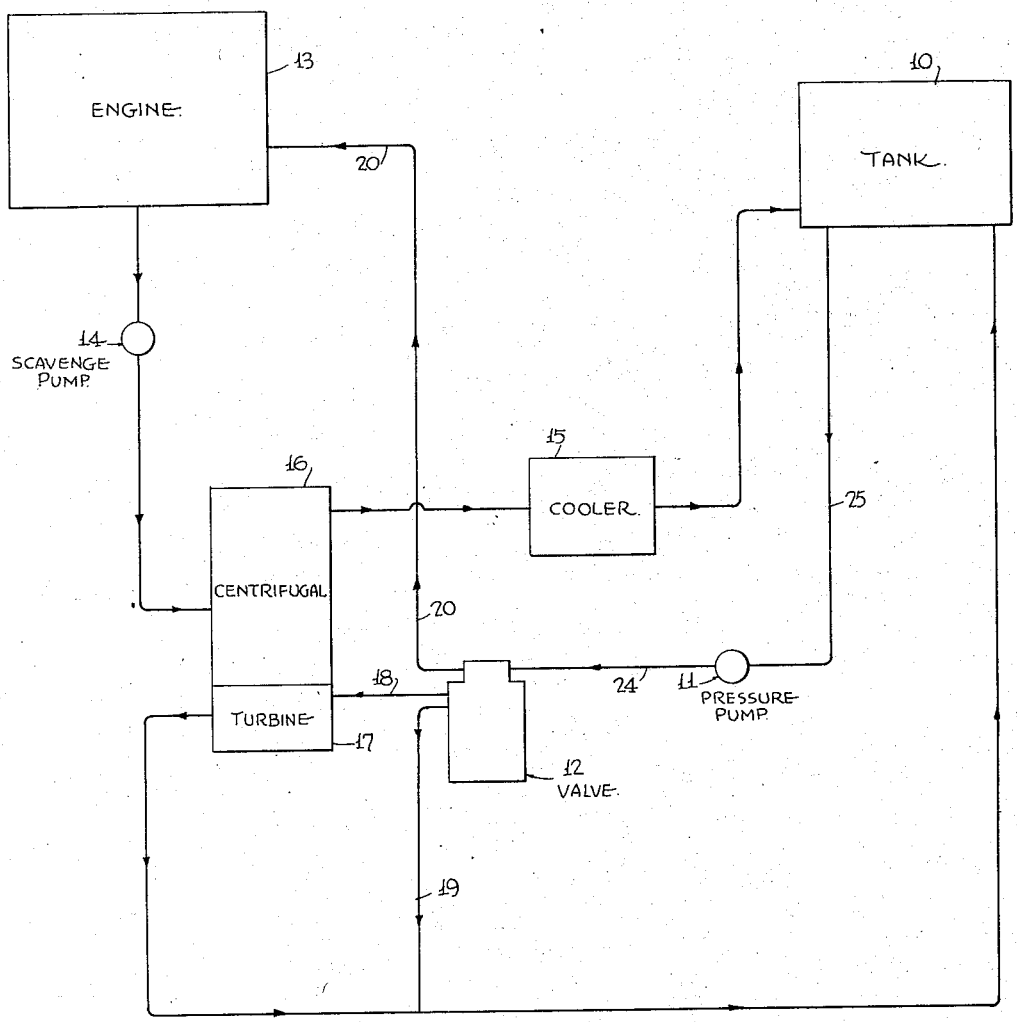

July 25, 1944.     L. P. SHARPLES     2,354,352
OIL PURIFYING SYSTEM
Filed Sept. 26, 1942     2 Sheets-Sheet 1

INVENTOR
Laurence P. Sharples
BY Maurice A. Crews
ATTORNEY

July 25, 1944.   L. P. SHARPLES   2,354,352
OIL PURIFYING SYSTEM
Filed Sept. 26, 1942   2 Sheets-Sheet 2
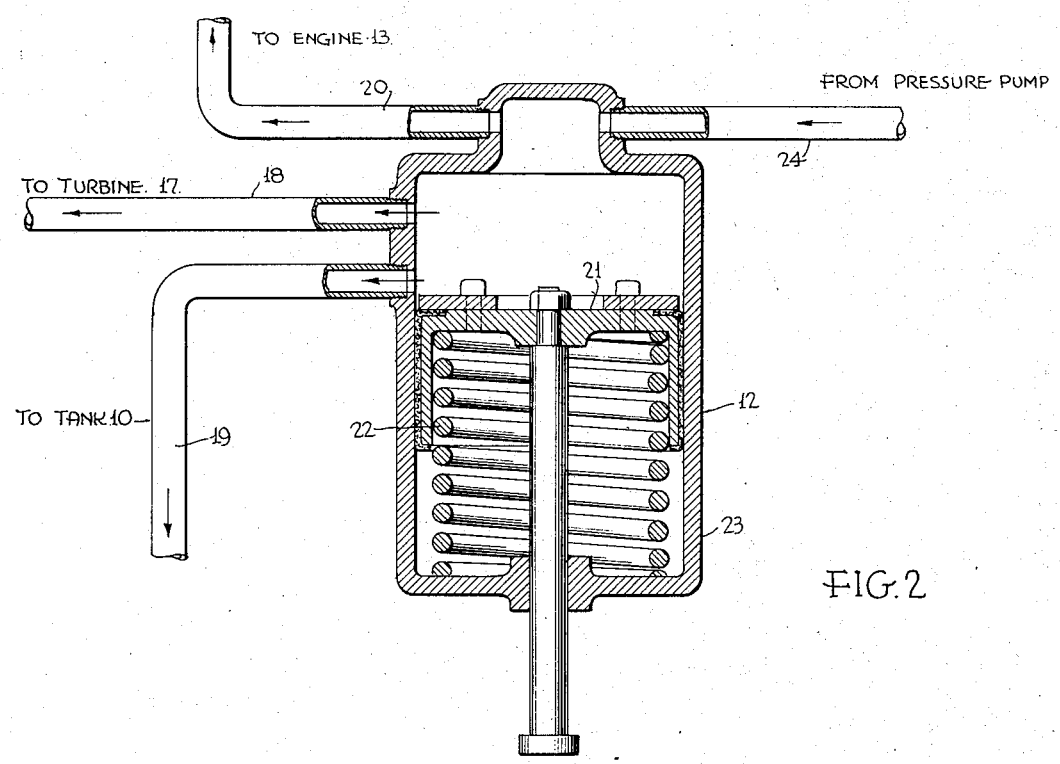
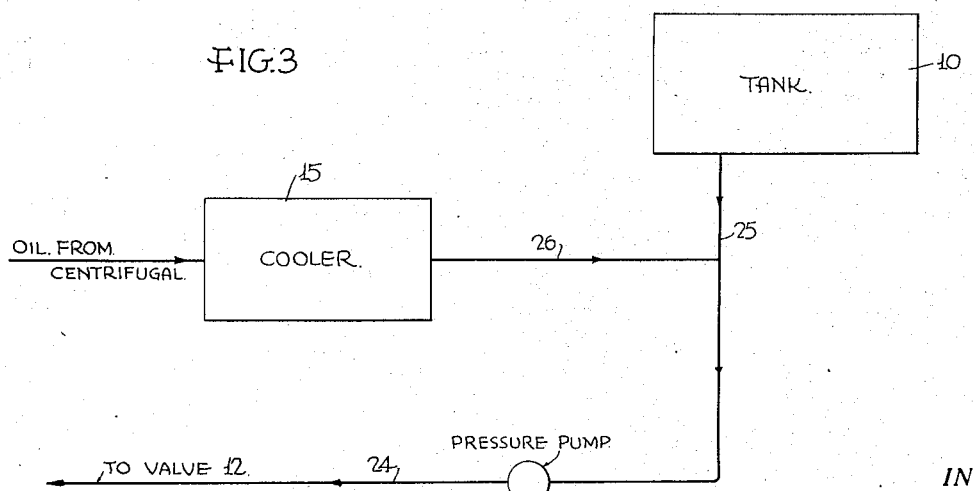
INVENTOR
Laurence P. Sharples
BY Maurice A. Crews
ATTORNEY Patented July 25, 1944

2,354,352

UNITED STATES PATENT OFFICE 2,354,352

OIL PURIFYING SYSTEM

Laurence Price Sharples, Ardmore, Pa., assignor to The Sharples Corporation, Philadelphia, Pa., a corporation of Delaware Application September 26, 1942, Serial No. 459,848

11 Claims. (Cl. 184—6)

The present invention pertains to a centrifugal apparatus for purifying liquids and to the combination of such an apparatus with other features of a lubricating system. While features of the invention may be used in a variety of applications, they will be described for purposes of illustration and convenience in their relation to the lubricating system of an aviation engine, since that is the purpose for which they were originally conceived.

The lubricating system of an airplane engine often includes an oil storage tank, a conduit from the storage tank to the engine, a feed pump on or in the engine for pumping oil to the various parts of the engine to lubricate it, a sump in the engine into which the oil drains from the various parts of the engine, a scavenge pump for pumping oil from the sump, a conduit from the scavenge pump to an oil cooler, an oil cooler and a conduit back to the oil storage tank.

The scavenge pump or pumps ordinarily have a displacement which may be two to three times as great as the oil feed rate of the feed to the engine. This relationship of capacities between the scavenge pump or pumps and the flow of oil to the engine is necessary to insure the continuous removal of all of the oil which drains into the sump. A necessary incident to this relationship, however, is the fact that gases from the crank-case are pumped by the scavenge pump or pumps together with the oil through the oil cooler and into the storage tank. The pumping of these gases through the oil cooler increases the drop in pressure through the cooler and the back-load on the scavenge pump or pumps, and results in the use of an air-oil mixture throughout the lubricating system which is disadvantageous from several standpoints. Lower capacity of the pumps results, especially at high altitude flight, larger conduits are required, excess capacity oil tank is needed to prevent foaming-over, less heat is carried from the bearings due to lowered specific heat of the lubricant, larger area bearings are required, and more frequent oil changes are required due to excessive oxidation.

The present invention is concerned particularly with the provision of a centrifugal separator in the line of flow of oil from the scavenge pump, for the purpose of purifying and/or deaerating that oil. Direct mechanical drive of the centrifugal by the engine involves difficulties, as the high speed centrifugal rotor is not readily accelerated to high speed, decelerated or reversed, directly as the engine accelerates, decelerates, or back-fires. Turbo-drive of the centrifugal by the oil it is purifying may require an undesirable added load on the scavenge pump or pumps, in addition to that caused by the air in the oil; and such a drive makes it difficult to deaerate the oil centrifugally in addition to removing sediment from it, since to deaerate the oil usually involves its axial discharge from the rotor, which in turn precludes the use of a reaction turbine.

A feature of the present invention consists in the fact that it provides an arrangement by which a centrifugal mounted in the line of flow of oil from the scavenge pump, and designed to purify oil from the scavenge pump, is driven by turbo effect, not from the oil being purified, but from oil pumped by the feed pump of the oil circulating system during the natural performance of its function of feeding oil to the engine.

A particular advantage of the present invention consists in the fact that the oil may be subjected to centrifugal treatment for removal of both air and solids, and that it is this deaerated oil which enters the feed pump and thereafter serves to drive the centrifugal rotor under power derived from that pump. As the result of this combination, the pump from which power to drive the centrifugal is derived does not have its capacity so seriously depressed by increased altitude or flow resistance as in present customary installations, and this pump can therefore function more efficiently in driving the centrifugal. Other disadvantages of having air mixed with oil, as outlined above, are also obviated.

It is a peculiar feature of an aviation lubricating system that the pressure pump pumps at its maximum capacity when it is on or near the ground, and the oil in the lubrication system needs purification more when the plane is on or near the ground since the air at that time is more likely to be laden with dust particles. The proposed invention utilizes this peculiarity as at low altitude the higher capacity of the pump issues a supply of excess oil under pressure from that pump to drive the centrifugal.

Further features and advantages of the invention will be evident from consideration of the following detailed description in the light of the attached drawings, in which, Figure 1 is a flow sheet illustrating a preferred arrangement of parts for practice of the present invention, Figure 2 is a cross-sectional view of the valve 12 of Figure 1, and Figure 3 is a flow sheet illustrating a modification.

Referring to the drawings by reference characters, the system includes elements of an aviation oil circulating system comprising a storage tank 10 from which oil is fed by a pressure feed pump 11 through a valve 12 to the engine 13 for use therein. After performing its function in lubricating the engine bearings, the oil is withdrawn from the engine by a scavenge pump 14 and may be passed through a cooler 15 before return to the storage tank 10. A centrifugal 16 is provided in the line of flow of at least part of the oil from the scavenge pump 14, between that scavenge pump and the storage tank 10, and the features of the present invention relate to the manner of driving that centrifugal. The centrifugal 16 is preferably of a type adapted to separate gases from the oil simultaneously with the removal of solids or liquid impurities. Centrifugals provided with special arrangements to effect such separation and discharge of gases are illustrated in British patent 258,204 and in the U. S. patent application of John J. Serrell, Serial No. 461,269, filed October 8, 1942.

A fundamental feature of the invention consists in the fact that the centrifugal 16 is driven by oil from the feed pump. The centrifugal rotor may be driven by turbo action, as by a turbine 17, or by other suitable type of oil driven motor. While the turbine 17 may be placed in the line of feed between the pump 11 and engine 13 within the broad scope of the invention, the invention includes a system whereby only excess oil pumped by the pump 11 is used to drive the centrifugal. Thus no additional load is imposed on that pump and the oil line to the bearings is not involved. To accomplish this, oil from pump 11 passes to the relief valve 12 which permits excess oil to pass to turbine 17 and permits additional excess oil to pass to the tank 10 or elsewhere in the return oil line.

A form of the valve 12 by which the above control of flow of the oil from the pressure pump is achieved is illustrated in Figure 2 of the drawings. This valve comprises a cylinder 23 containing a piston 21 which is urged upwardly as illustrated by a spring 22. Oil from the pump 11 is passed through conduit 24 into conduit 20 in passing to the engine. Conduit 18 interconnects an upper part of the cylinder 23 with the centrifugal turbine 17 and a conduit 19 interconnects a lower part of this cylinder with the tank 10, as illustrated also in Figure 1. The spring 22 is of such strength that the piston 21 will not be depressed to a position interconnecting the conduit 24 with the conduit 18 until a predetermined pressure is reached, thereby assuring that the engine 13 will always receive an adequate supply of oil from the pressure pump 11. Upon the development of a predetermined pressure, the piston 21 will be depressed to a point establishing communication between conduit 24 and conduit 18, thereby by-passing a part of the oil through the turbine 17 for operation of the centrifugal 16. In case of development of a pressure higher than that desired in the oil passed through the conduit 18, the piston 21 will be still further depressed with the result that communication will be established between conduit 24 and conduit 19 to return a part of the oil through the conduit 19, thereby relieving excess pressure which might otherwise be developed in the conduits 18 and 20.

Figure 3 of the drawings illustrates a modification whereby oil passing through the cooler 15, instead of passing to the tank 10, passes directly to the conduit 25 by which oil is fed to the pressure pump 11. As there illustrated, a conduit 26 interconnects the cooler 15 directly with the conduit 25 and oil passed through the cooler is returned directly by this conduit to pressure pump 11. Such an arrangement is feasible in the use of a system in which the oil is deaerated before passing to the cooler 15, as a part of the function of the tank 10 is ordinarily one of partial deaeration. In the system as illustrated, since the oil is deaerated by the centrifugal, it may be returned directly to the pressure pump, thereby saving a certain amount of piping and simplifying the system while reducing the weight of the installation.

The oil tank is frequently remote from the engine whereas the pumps are attached to the engine and the cooler frequently is alongside of it. In present installations an oil line large enough to accommodate the full flow of oil to the engine must run from the engine to the oil tank and a return line must run from the oil tank to the engine. In this proposed installation the long pipe from the engine to oil tank can be of smaller size since it only has to carry make-up oil and need be only one line instead of two.

Various modifications are possible within the scope of the invention, and I do not therefore wish to me limited except by the scope of the following claims.

I claim:

1. In a lubricant purification system, the combination comprising an engine, a scavenge pump for removing lubricant from said engine, a centrifugal separator including a centrifugal rotor mounted in the line of flow of lubricant from said scavenge pump, a lubricant feed pump for feeding lubricant to said engine, a turbine associated with said centrifugal rotor for driving the same, and connections between said lubricant feed pump and said turbine for driving said turbine under energy imparted to said lubricant by said feed pump.

2. In a lubricant purification system, the combination comprising an engine, a scavenge pump for removing lubricant from said engine, a centrifugal separator including a centrifugal rotor mounted in the line of flow of lubricant from said scavenge pump, a lubricant feed pump for feeding lubricant to said engine, a turbine associated with said centrifugal rotor for driving the same, and connections between said lubricant feed pump and said turbine for driving said turbine under energy imparted to said lubricant by said lubricant feed pump upon development of a predetermined pressure in the line connecting said lubricant feed pump with said engine.

3. In a lubricant purification system, the combination comprising an engine, a scavenge pump for removing lubricant from said engine, a centrifugal separator including a centrifugal rotor mounted in the line of flow of lubricant from said scavenge pump, a lubricant feed pump for feeding lubricant to said engine, a turbine associated with said centrifugal rotor for driving the same, and a valve in the line between said lubricant feed pump and said engine, said valve including a pressure relief connection for feeding lubricant to said turbine for driving said turbine under energy imparted to said lubricant by said lubricant feed pump only when the pressure at said pressure relief connection exceeds a predetermined magnitude.

4. In a lubricant purification system, the combination comprising an engine, a scavenge pump for removing lubricant from said engine, a centrifugal separator including a centrifugal rotor mounted in the line of flow of lubricant from said scavenge pump, a lubricant feed pump for feeding lubricant to said engine, a turbine associated with said centrifugal rotor for driving the same, a valve in the line between said lubricant feed pump and said engine, said valve including a pressure relief connection for feeding lubricant to said turbine for driving said turbine under energy imparted to said lubricant by said lubricant feed pump only when the pressure at said pressure relief connection exceeds a predetermined magnitude, and a second pressure relief connection for by-passing feed of lubricant from said turbine upon development of pressure at said second pressure relief connection above a second and higher predetermined magnitude.

5. In a lubricant purification system, the combination comprising a bearing, a pump for impelling lubricant to said bearing, a centrifugal lubricant purifier including a centrifugal rotor, means for directing lubricant from said bearing to said rotor, and means actuated by lubricant impelled by said pump for driving said rotor.

6. In a lubricant purification system, the combination comprising a bearing, a pump for impelling lubricant to said bearing, a centrifugal lubricant purifier including a centrifugal rotor, means for directing lubricant from said bearing to said rotor, and means actuated by lubricant impelled by said pump during its passage from said pump to said bearing for driving said rotor.

7. In a lubricant purification system, the combination comprising a bearing, a pump for impelling lubricant to said bearing, a centrifugal lubricant purifier including a centrifugal rotor, means for directing lubricant from said bearing to said rotor, means actuated by lubricant impelled by said pump for driving said rotor, and means responsive to development of a predetermined pressure for causing lubricant to flow through said last-named means to drive said rotor only upon development of said predetermined pressure.

8. In a lubricant purification system, the combination comprising a bearing, a pump for impelling lubricant to said bearing, a centrifugal lubricant purifier including a centrifugal rotor adapted to separate gases from said lubricant, means for directing lubricant from said bearing to said rotor, and means actuated by lubricant impelled by said pump for driving said rotor.

9. In a lubricant purification system, the combination comprising a bearing, a pump for impelling lubricant to said bearing, a centrifugal lubricant purifier including a centrifugal rotor, a scavenge pump for directing lubricant from said bearing to said rotor, and means actuated by lubricant impelled by said first-named pump for driving said rotor.

10. In a lubricant purification system, the combination comprising a bearing, a pump for impelling lubricant to said bearing, a centrifugal lubricant purifier including a centrifugal rotor, a scavenge pump for directing lubricant from said bearing to said rotor, means actuated by lubricant impelled by said first-named pump for driving said rotor, and a cooler interposed in the line of flow of lubricant from said rotor.

11. In a lubricant purification system, the combination comprising a lubricant tank, a bearing, a pump for impelling the lubricant to said bearing, a centrifugal lubricant purifier including a centrifugal rotor, means for directing lubricant from said bearing through said rotor, means actuated by lubricant impelled by said pump for driving said rotor, and means for directing lubricant passed through said rotor to said pump without return thereof to said tank.

LAURENCE PRICE SHARPLES.